United States Patent

Robinson

[11] Patent Number: 5,926,799
[45] Date of Patent: Jul. 20, 1999

[54] COMPUTERIZED LINENS MANAGEMENT SYSTEM FOR HOTELS AND SIMILAR INSTITUTIONS

[76] Inventor: Jack H. Robinson, 8380 Greensboro Dr., Unit No. 5-718, McLean, Va.

[21] Appl. No.: 07/711,537

[22] Filed: Jun. 10, 1991

[51] Int. Cl.$^6$ ............................................. G06F 17/60
[52] U.S. Cl. .................................. 705/28; 705/5
[58] Field of Search ............................... 364/400, 401, 364/403; 235/375; 705/5, 6, 8, 9, 28

[56] References Cited

U.S. PATENT DOCUMENTS

| | | | |
|---|---|---|---|
| 3,478,316 | 11/1969 | Block et al. | 235/385 |
| 3,675,204 | 7/1972 | Miehle et al. | 340/525 |
| 4,072,825 | 2/1978 | McLay et al. | |
| 4,473,373 | 9/1984 | Weiss | 8/137 |
| 4,737,910 | 4/1988 | Kimbrow | 364/403 |
| 4,920,488 | 4/1990 | Filley | 364/403 |
| 5,114,187 | 5/1992 | Branch | 283/81 |

OTHER PUBLICATIONS

*Hotel & Motel Management*, Feb. 4, 1991, "Punching Up Profits: Hoteliers Grasp Benefits of Handheld Computers", p. 37.

*Data Sources*, Computer Associates International, Garden City, NY, Copyright 1989, pp. J–386 to J–388.

*Primary Examiner*—Frantzy Poinvil

[57] ABSTRACT

In a computerized linens management system for a hotel, room attendants place soiled linens in bags identified with corresponding room numbers. All soiled items placed in each room bag and all linen items missing from the room are recorded on a ticket placed in or affixed to the bag. The soiled and listed items are entered into the computer, room by room, permitting the computer, on command, to provide a laundry shipping list and a replenishment list showing linen replenishment requirements for linen closets serving specified rooms. Daily entry of room occupancy status, updated as each room is made up, permits the computer to provide a list of current make-up status of all rooms as well as individual room assignment lists for respective room attendants. Clean linen items returned from the laundry are counted and the count information is also entered into the computer to permit a comparison with the corresponding previous shipping list so as to determine shortages and overages. Complete linens inventory, repurchase orders and cost information is also available from the computer on command.

21 Claims, 2 Drawing Sheets

FIG.1

| LINEN CONTROL TICKET | ROOM # ___________ | | | | M I S S. |
|---|---|---|---|---|---|
| DBLE SHEETS | 1 | 2 | 3 | 4 | ___ |
| KING SHEETS | 1 | 2 | 3 | 4 | ___ |
| DBLE CRINKLE | 1 | 2 | 3 | 4 | ___ |
| KING CRINKLE | 1 | 2 | 3 | 4 | ___ |
| PILLOW CASES | 1 | 2 | 3 | 4 | ___ |
| BATH ROBES | 1 | 2 | 3 | 4 | ___ |
| BATH RUGS | 1 | 2 | 3 | 4 | ___ |
| BATH MATS | 1 | 2 | 3 | 4 | ___ |
| BATH SHEETS | 1 | 2 | 3 | 4 | ___ |
| BATH TOWELS | 1 | 2 | 3 | 4 | ___ |
| HAND TOWELS | 1 | 2 | 3 | 4 | ___ |
| WASH CLOTHS | 1 | 2 | 3 | 4 | ___ |
| SHOWER CURTAINS | 1 | 2 | 3 | 4 | ___ |
| DBLE BED PADS | 1 | 2 | 3 | 4 | ___ |
| KING BED PADS | 1 | 2 | 3 | 4 | ___ |

FIG.2

COMPUTERIZED LINENS MANAGEMENT SYSTEM FOR HOTELS AND SIMILAR INSTITUTIONS

BACKGROUND OF THE INVENTION

1. Technical Field

The present invention relates to the control and tracking of linens in a hotel, hospital or other similar institution having individual rooms wherein linens must be changed after use. More particularly, the present invention relates to a computerized system for providing a complete accounting for all linen items, clean and soiled, currently in the institution, and all of the institution's linen items being processed by a laundry facility. Although the preferred embodiment of the invention is described herein as used in a hotel, it is to be understood that the system of the invention is useful for any institution having multiple units or rooms wherein linens are used and must be laundered and replaced.

2. Discussion of the Prior Art

For purposes of supplying linens to individual rooms in a hotel, the rooms are typically grouped, either by floor, floor sections or plural floors. Each group of rooms is served by a respective linen closet, alcove, or the like, from which a room attendant obtains clean linens for making up the rooms. The attendant takes the necessary clean linen items from the closet to the room requiring change, removes the soiled linens, and makes up the room with the clean linens. The soiled linens are collected from the individual attendants and are sent to a laundry facility that may be located within or outside the hotel. Clean linens returned to the hotel from the laundry are taken to the linen closets as needed for make-up of the various rooms.

A significant problem faced by hotels results from the fact that hotel management does not have available an accurate accounting of all linen items at various stages of linen use, laundering and storage. For example, room attendants often find that the linen closet or alcove lacks sufficient linen items to permit make-up of rooms. Sometimes the items are available in a central storage location; at other times the items are not available. In either case, it is both time-consuming and wasteful of manpower to require unnecessary communication between the room attendant and the central location, to require searching for replacement items, and to require delivery of individual replacement items to the various floors of the hotel. In addition to the resulting cost disadvantages, this causes delays in completion of the room make up process and sometimes causes rooms to be made up with incomplete linens, usually to the annoyance of the guests. Of course, assurance that linen items are always available can be obtained by purchasing many more items than are actually needed. However, this is very costly and, therefore, not a desirable solution to the problem.

Another expense incurred by hotels is caused by the need to replace linen items that are lost or stolen. Theft is particularly troublesome since it can occur at the room level (by guests), the storage closet level (by attendants), central storage or sorting facilities (by other hotel personnel) and the laundry (by laundry personnel). Theft and loss of linen items and the absence of accurate linen accounting make it impossible to determine the location and quantity of each linen item at any instant of time.

A further significant expense for hotels results from the inefficient use of labor involved in delivering linen items to linen closets, taking physical inventory of linen items and making up the individual rooms.

OBJECTS AND SUMMARY OF THE INVENTION

It is therefore an object of the present invention to provide a method and apparatus for permitting a hotel or similar institution to keep track of all of its linens and thereby significantly reduce expenses.

It is another object of the present invention to provide a method and apparatus for controlling linen service in a hotel, or the like, so as to reduce the likelihood of theft.

A further object of the present invention is to provide a computerized linens management system for use in a hotel or the like in order to maintain a perpetual linen inventory control, reduce the cost of labor relating to linen distribution and transport, and promptly identify losses of linen items.

In accordance with the present invention, status information for each hotel room is maintained in a computer and updated at the start of each day to indicate rooms requiring cleaning that day. This information is used to assign the rooms requiring cleaning to the room attendants who are provided with individual room assignment lists printed out by the computer and containing the room attendant's name, the number of each room assigned to that attendant, the type of room thusly assigned, the number of people occupying the room, and the room status (i.e., occupied or vacant). A "rooms check" report is also printed and repeatedly updated throughout the day to provide a continuous overview of progress by the room attendants, housemen who collect soiled linens from room attendants, and personnel entering soiled data information into the system.

Each room attendant is required to place all soiled linen collected from a room into a bag for that room and then record each such item on a linen control ticket that is then placed in the bag. The linen control ticket identifies the room, and any linen items missing from the room must also be identified on the ticket by the room attendant. The bags of soiled linen are transported (e.g., by a houseman, laundry chute, etc.) to a collection location, and each linen control ticket is removed at that location so that the information recorded thereon can be entered into the computer. This information is entered on a room by room basis and includes the quantity of each type of soiled linen item collected for the room and the quantity of each type of linen item missing from the room. As the information for each room is entered, the "rooms check" report is automatically updated in the computer.

After entry of data from the linen control tickets for all rooms requiring cleaning for the day, the system may be actuated to provide a shipping list and a replenishment list. The shipping list indicates the total amount of each soiled linen item being sent to the laundry facility. The replenishment list indicates, by linen closet or alcove, the quantity of each linen item that must be replenished in that closet or alcove.

BRIEF DESCRIPTION OF THE DRAWINGS

These and other objects, features and many of the attendant advantages of the present invention will be appreciated more readily as they become better understood from the reading of the following description considered in connection with the accompanying drawings wherein.

DESCRIPTION OF THE PREFERRED EMBODIMENT

Figure 1:
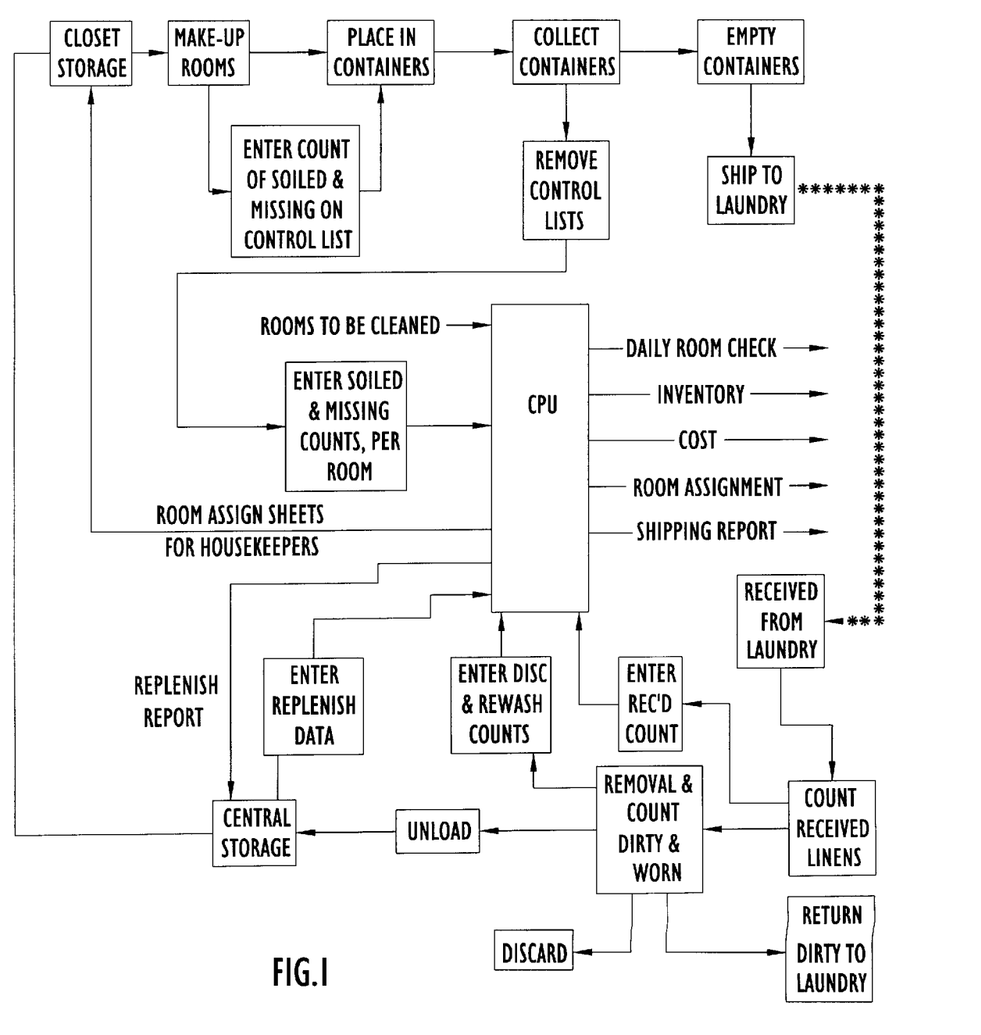
FIG. 1 is a block diagram including a flow chart of a system of one embodiment of the present invention showing both information flow and product flow.

The hotel linens management system illustrated in the drawing includes a central processing unit (CPU) into which data is entered via a keyboard, or the like, by hotel supervisory personnel. Information required for data entry is derived from room attendants, and other linen room personnel, each of whom perform specific functions affecting the linens transfer and placement. In the following description, the responsibilities of the various personnel are described with reference to the drawing and in relation to CPU operation. In addition to the drawing, reference is made to the Tables appearing at the end of the description and representing displays appearing on the computer screen and lists that may be printed therefrom.

It must first be noted that the system is initialized when first placed in use by entering the quantity, type and hotel location of all linen items in the hotel. If some items are in the process of being laundered, this information is also entered into the system. Further, as new linen items are purchased or worn items are discarded, these transactions are likewise entered.

In considering the responsibilities of various hotel personnel, it is important to note that any transfer of linens from one location in the hotel to another, or from or to the laundry, must be communicated to the supervisor in charge of entering data into the CPU. The supervisor then enters the number and type of linen items being transferred, along with the source and destination locations of that transfer. In this manner the CPU is able to maintain a current inventory list specifying, at all times, the locations of all of the hotel's linens.

The CPU illustrated in the drawing is typically an IBM (or compatible) 386 computer having at least a forty megabyte hard disk utilizing either stand alone or multi-user network systems on a real time basis.

At the beginning of each day the supervisor enters into the computer all of the rooms requiring linen change. These rooms are either check out rooms or occupied rooms, and the information is obtained from the hotel night auditor's report. The supervisor typically selects a "daily rooms processing" category from a first menu list displayed by the computer and then selects an "input daily rooms on change" category from a second menu. In response the computer displays a list of all of the hotel rooms, by number, indicating the type of each room and a designation "*IS*" indicating that the room is in service. Then, with the screen cursor moved to each room location in sequence, the supervisor can enter the room status (i.e., check out or occupied) in place of the in service designation, the information being derived from the night auditor's information.

Table I, presented hereinbelow, is an example of the list of all hotel rooms displayed by the computer to permit entry of the rooms on change (i.e., to be cleaned that day). If the hotel has more rooms than can be listed on a single screen presentation, the other rooms are presented in sequence on subsequent pages of display similar to that illustrated in Table I. It is noted that, at the start of the procedure, and with the cursor set at the first listed room, all of the rooms are designated as being in service (i.e., *IS*). The listing for room 101 thus appears as "0101 DBLE *IS*" wherein the first four digits represent the room number, the "DBLE" letters indicate that the room has two double beds, and the last four characters indicate that the room is in service (as opposed to rooms being repaired, painted, etc., and not available for use). Other room types designated in Table I are: "KING" (one king size bed); "QUEN" (one queen size bed); "LKNG" (one over-size king size bed); "SDBL" (one double bed); "TWIN" (two twin beds); and "GSTE" (giant suite). As the supervisor enters status for each room at the cursor position, the cursor moves to the next room in sequence. With each entry the last four characters for the respective room are changed to designate room status. When the status for all of the rooms on change has been entered, the display looks something like that presented in Table II. Note that room 101 still shows an in service status, indicating that the room does not require linen change for the current day (i.e., it was not occupied on the previous day). On the other hand, the status of room 102 is represented by the characters "0100". The first two characters indicate that the room remains occupied (0) by one person (1); the second two characters are used to identify the room attendant to whom the room is assigned and shows up as "00" since room assignments have not yet been made. Likewise, the status of room 104 appears as "D100" indicating that the single occupant of that room is due out (D) of the room on this day and that the room has not yet been assigned to a room attendant.

Figure 2:
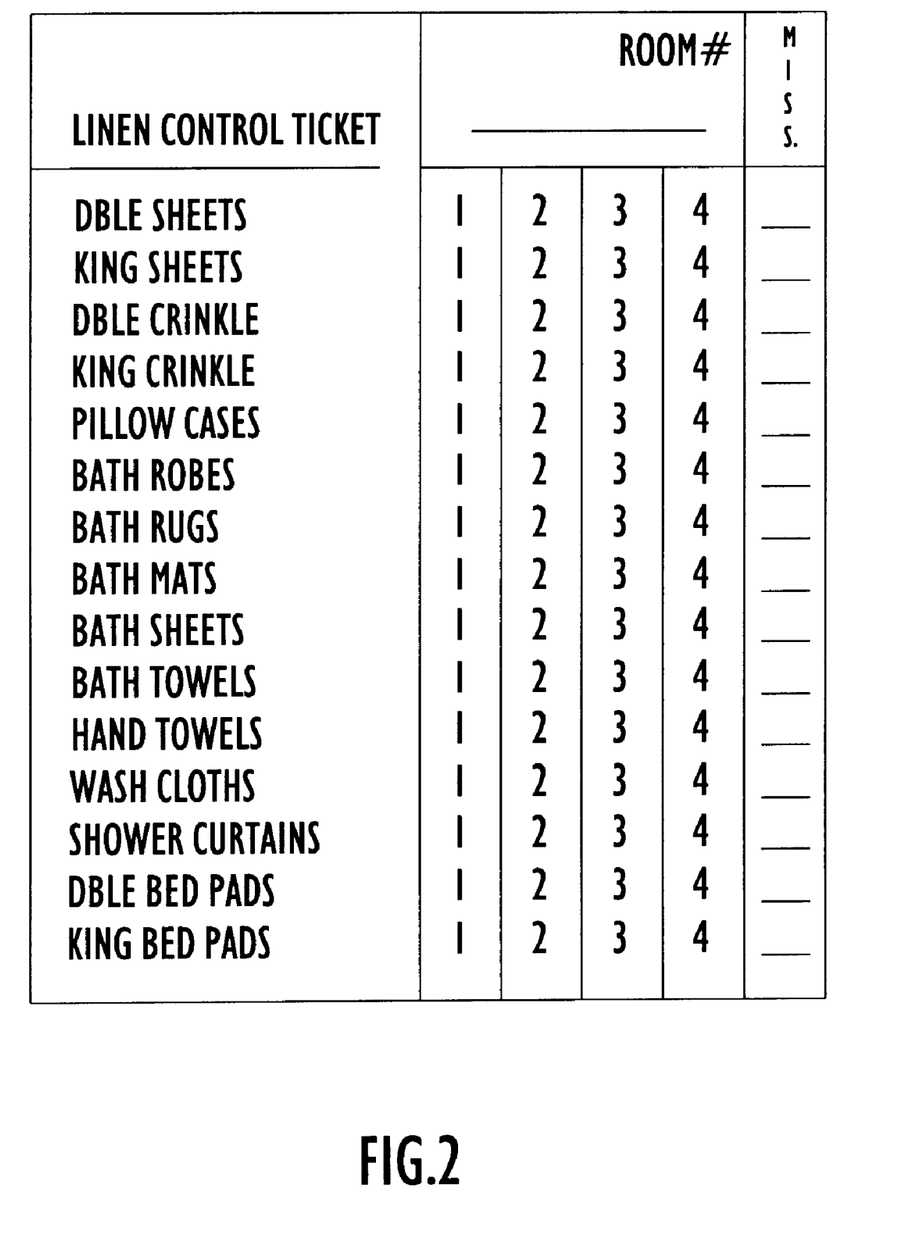
FIG. 2 is a plan view of a linen control form employed in using the system of the present invention.

After the status has been entered for all of the rooms on change for the current day, including the additional rooms listed on subsequent pages of the room status list, the supervisor, by actuation of a designated control key or keys, can delete the rooms not on change for the day (i.e., rooms not occupied the previous day as represented by the "*IS*" status after all of the rooms on change have been entered). With this display (i.e., rooms not on change deleted), the supervisor can enter assignments of rooms to room attendants using the last two digits of each room's status indication. An example of a display where all of the displayed rooms have already been assigned to attendants appears in Table III. In this table it is noted, for example, that rooms 102, 103, 104, 107, 109, 112, 114, 123, 126, 131, 132, 135, 301, 302 and 304 have been assigned to the room attendant identified by the digit code "01". The rooms may be assigned one at a time or in groups, depending upon the particular system. Once all of the rooms have been assigned in this manner to the various room attendants, a room change worksheet for each room attendant may be printed out to be distributed to that attendant. This sheet lists all rooms to be changed by that attendant and an example of the sheet is provided in Table IV for room attendant Jones identified by code "01". Note that the room attendant's code number and name appear at the top of the sheet, and that the list indicates the number of each room assigned to that attendant, the status of the room (i.e., occupied or due out), the number of people occupying the room during the previous night, and the type of room. There is also a space for comments about each room to be inserted by the room attendant for use by the supervisor, such comments generally relating to items that are in need of repair, missing, etc. In addition, the room attendants are provided with linen control tickets, at least one for each assigned room, that must be filled in when the room is made up. A typical such ticket is illustrated in FIG. 2.

The supervisor can now cause the computer to print out a daily rooms check report comprising five sections, namely: A Rooms Not Changed report (Table V); A Rooms Changed Not Occupied report (Table VI); A Rooms Summary Report (Table VII); A Rooms Occupancy Report (Table VIII); and A Rooms Check Report (Table IX). The combination of these reports, which are automatically updated as information is entered into the computer during the day, permits the supervisor to monitor progress of the room attendants, the housemen who collect room containers of soiled linens, and individuals who enter soiled linen data into the system.

The Rooms Not Changed report (Table V) indicates all of the rooms, by floor and type, that need to be cleaned. As the soiled linen data for each room is entered into the system (as described below), this report is updated by deleting rooms that have been cleaned from the list.

The Rooms Changed Not Occupied report (Table VI) serves to indicate those rooms, if any, that have been cleaned during the day but were not designated as due out or occupied rooms in the night auditor's report and, therefore, were not entered as rooms to be cleaned in the Room Status Report at the beginning of the day. For example, if room 1004 appears as vacant and clean on the night auditor's report, but during the course of the day it was learned that room 1004 is not vacant and clean, the room is assigned to a room attendant. Upon entry into the computer of the soiled linen information for room 1004 in the manner described below, the computer automatically places that room on the "Rooms Changed Not Occupied" report to indicate to the supervisor that the room has been cleaned.

The Rooms Summary Report (Table VII) provides a synopsis of the quantity of each type of clean linen item that has been placed in rooms as of the time that this report is being printed. Again, this information is automatically added to the report upon entry into the computer of soiled linen information relating to the individual rooms.

The Rooms Occupancy Report (Table VIII) is also updated during the day as rooms are cleaned (i.e., as soiled linen information is entered into the computer for each room). This report provides an indication of the total number of rooms per floor, the number of those rooms requiring change of linens that day, and the number and percentage of the latter rooms that have been changed. Entry of soiled linen information into the computer for each room signifies to the computer that such room has had its linens changed (i.e, it has been cleaned). All of the reports and lists, including the Rooms Occupancy Report, are updated accordingly. Thus, as the day goes on, the number of rooms not changed decreases, both on the Rooms Occupancy Report (Table VIII) and on the Rooms Not Changed report (Table V). This indicates to the supervisor the progress of the room attendants on each floor, the progress of the housemen who pick up the bags of soiled linens and remove the linen control tickets, and the progress of the individual who enters the soiled linen data for each room into the computer from information appearing on the linen control tickets.

The Rooms Check Report (Table IX) enables the supervisor to check discrepancies in soiled linen information that may be created by room attendants failing to circle the correct numbers on the linen control tickets and/or by data entry personnel in entering wrong soiled linen data into the computer. Specifically, the computer has stored therein the linen par for each type of room (i.e., the quantity of each type of linen item used in each type of room). Thus, for example, room 123 is a king room and the Room Check Report indicates that four soiled pillowcases were removed from that room. The computer par storage information indicates that par for a king room includes three pillowcases. Accordingly, the linen items for room 123 appear on the Rooms Check Report and an asterisk is placed adjacent the pillowcase quantity to alert the supervisor of the discrepancy. The supervisor will then check the bag of soiled linens for room 123 and the linen control ticket for that room. If only three pillowcases are in the bag but four pillowcases are circled on the linen control ticket, the room attendant has erroneously marked the linen control ticket. If three pillowcases are in the bag and three pillowcases are circled on the linen control ticket, then an error was made in entering the data into the computer. In either case, the error is corrected in the soiled linen entry data in the computer in the manner described below. If, on the other hand, four pillowcases are found in the bag, the entered data is permitted to remain in the system.

The daily responsibilities of individual room attendants are to: (1) make-up each of his or her assigned rooms with clean linens obtained from the linen closet or other intermediate storage location; (2) segregate and identify, by room, all soiled linen items removed from each room; and (3) identify all linen items missing from each room. When the room attendant makes up a room, soiled linen is placed into a container, such as a net or plastic bag. A room number tag is attached to the container and, in addition to bearing the room number, may be color coded to identify the room itself or the intermediate linen storage location for that room. The room number tag is typically attached to the container by linen room personnel or it can be attached by the room attendant. The room attendant also completes the linen control ticket (FIG. 2) indicating the type and quantity of linen items removed from the room and placed in the bag. This is done by circling the appropriate quantity for each linen item on the ticket. Further, the room attendant determines, by counting the soiled linen and the clean linen left in the room, if there are items missing from the established par for that room. The quantity missing for each type of linen item is entered in the space provided in the right hand column of the ticket in FIG. 2. A special missing item tag may be placed into or affixed to the container for each missing item. These missing item tags have the name of the missing item printed thereon and are also color coded to facilitate identification of the missing item. It is possible, for some embodiments of the invention, to eliminate the missing item tags and, instead, rely only on the room attendant's entries on the linen control ticket. The room container or bag of soiled linen is taken to a soiled linen closet, or left at some other processing area of the building, or dropped into a linen chute, depending upon the configuration of the hotel, so that the individual room containers can be collected by a houseman. The room is made-up with linen items taken from the linen closet or other intermediate storage location serving that room.

The responsibilities of the housemen are to: (1) collect all of the bags of soiled linens from the floors of the hotel and bring them to the sorter room; (2) remove the linen control ticket from each bag of soiled linens; (3) check the soiled linen counts on the ticket against the items in the bag to assure that the quantities circled on the tickets are correct (note: this is usually only a spot check of a relatively small number of bags); (4) give the linen control tickets to the individual responsible for entering soiled linen information into the computer; and (5) sort the soiled linen items by type for transport to the laundry, although this sorting may be done at the laundry to save abuse during transport.

The individual responsible for the input of soiled linen information into the computer enters the system Utilities Menu from the main system menu and then selects the daily soiled linen input process. In this mode the number of any room can be selected and, in response, the linen par for that room is displayed. The quantities for each linen item in the display are entered by the computer operator, item by item, for the soiled items removed from the room as circled on the linen control ticket for that room. In addition, if the linen control ticket indicates that linen items were missing from the room, those items are entered into an appropriate column on the display for that room. The soiled linen information for the room, as now presented on the display, can be entered into the system by actuating a designated control key. This also permits another room to be accessed for entry of soiled linen information in a similar manner while updating all of the affected lists stored in the system.

After data from all of the room linen control tickets have been entered into the computer, the operator can "close" the day by entering an appropriate command. This closure automatically creates a shipping report listing the total quantity of soiled linen of each type that has been collected from the room bags and sorted. The quantities for the shipping report are obtained automatically by the computer from the soiled linen information entered from the linen control tickets. In addition, the computer uses the entered soiled linen information to generate replenishment lists for each intermediate storage location (i.e., linen closet, floor, etc.). If arrangements have been made for the laundry to pack clean linens for specific linen closets or floors, copies of the replenishment lists are transmitted to the laundry so that the indicated quantities of each linen item may be packed in respective carts or other containers designated for specific linen closets or floors. Otherwise, housemen at the hotel replenish each closet or floor, according to the replenishment list, from items in central storage and items returned from the laundry.

As clean linen items are brought to each floor or closet by the housemen, or in prepacked carts from the laundry, the quantity of each such item is entered into the computer along with an indication of the floor or closet receiving the items and the location (i.e., central storage, another floor or closet, the laundry, etc.) from which those items were removed. In addition, when damaged items are discarded, or when items returned from the laundry are discovered to require rewashing and are sent back to the laundry, this information, including the quantities of each type of linen item, is entered into the computer. Other linen supply or transfer events, such as the placing of newly purchased linen items into central storage, placement of received laundered items into central storage, etc., are entered into the computer. Accordingly, the computer is able to keep constant track of the location of all linen items in the system. That is, the quantity and type of all linen items in central storage, in linen closets, in specific rooms, at the laundry, etc., are available at all times at the computer. Appropriate inventory lists for each floor, for example, or for the entire system, may be displayed or printed on command at the computer.

As indicated above, for some embodiments of the present invention, room tags may be attached to each soiled linen bag. When such bags are brought by the housemen to a sorting location, the room identification tags are removed from the bags and ultimately attached to other bags that are later delivered to the intermediate storage location for use by room attendants.

Housemen or other personnel are responsible for unloading clean items received from the laundry and for delivering the clean items to central storage or to the various intermediate linen storage locations for use by room attendants in making up the rooms. The received clean items are counted and verified against the corresponding shipping list to assure that all of the shipped soiled items are returned. The information relating to the count is given to supervisory personnel who enter the amount of clean linen delivered into the computer. The computer is then capable of providing a comparison report against the shipping list for the previous date to indicate shortages or overages. In distributing clean linen items to the intermediate linen storage locations, housemen typically first utilize all of the linen items delivered from the laundry. If there are not enough linen items to complete the required replenishment, additional linen items from central storage are utilized.

The linen control ticket illustrated in FIG. 2, as described above, is in a form that permits a room attendant to record the room number, circle the quantity of each soiled item placed in the soiled linen bag assigned to the room and enter the quantity of any linen items missing from par for that room. The ticket is placed in the bag along with the soiled linen items. It is to be understood, however, that other forms of linen control tickets or lists may be employed within the scope of the present invention. For example, the ticket or list may be of the type that is attached to the outside of the bag, possibly as part of the tie or closure arrangement for the bag. The linen control ticket or list may be a multiple copy form so that different copies of the list may be distributed to different personnel operating within the overall system. Any variation of the linen control ticket is suitable as long as it permits the room attendant to enter the quantity of each type of soiled item placed in the bag or container and the quantity of each linen item missing from the room.

It is contemplated that the information on the particular linen control ticket illustrated in FIG. 2 will be entered into the computer by hand from a keyboard, or the like. It will be appreciated, however, that the ticket can be designed for automatic reading of the recorded missing and soiled linen quantities, such as by optical character readers, bar code readers, and the like. Under such circumstances the quantities for each room are entered automatically and update the various stored lists and information in the manner described herein.

From the information available in the computer it will be appreciated that various other types of reports and lists may be compiled as desired for given applications. For example, the total cost of linen management may easily be computed on a daily, monthly or annual basis. The system may be programmed to provide indications when the supply of different types of linen items are running sufficiently low as to require purchase of additional items.

From the foregoing description it will be appreciated that the invention makes available a novel computerized linens management system for tracking linen items as they are transferred throughout a hotel or similar institution.

While I have described and illustrated a specific embodiment of my invention, it will be clear that variations of the details of construction and operation specifically illustrated and described may be resorted to without departing from the true spirit and scope of the invention as defined in the appended claims.

TABLE I

| \multicolumn{12}{c}{ROOM STATUS SPECIFICATION: (DATE)} |

| ROOM | TYPE | STAT | ROOM | TYPE | STAT | ROOM | TYPE | STAT | ROOM | TYPE | STAT |
|------|------|------|------|------|------|------|------|------|------|------|------|
| 0101 | DBLE | *IS* | 0102 | KING | *IS* | 0103 | KING | *IS* | 0104 | KING | *IS* |
| 0105 | TWIN | *IS* | 0106 | KING | *IS* | 0107 | KING | *IS* | 0108 | TWIN | *IS* |
| 0109 | KING | *IS* | 0110 | KING | *IS* | 0111 | TWIN | *IS* | 0112 | KING | *IS* |
| 0113 | TWIN | *IS* | 0114 | KING | *IS* | 0115 | LKNG | *IS* | 0117 | TWIN | *IS* |
| 0118 | KING | *IS* | 0121 | SDBL | *IS* | 0123 | KING | *IS* | 0124 | KING | *IS* |
| 0125 | TWIN | *IS* | 0126 | KING | *IS* | 0128 | TWIN | *IS* | 0129 | KING | *IS* |
| 0130 | TWIN | *IS* | 0131 | KING | *IS* | 0132 | KING | *IS* | 0133 | KING | *IS* |
| 0134 | TWIN | *IS* | 0135 | KING | *IS* | 0200 | GSTE | *IS* | 0201 | DBLE | *IS* |
| 0202 | KING | *IS* | 0203 | KING | *IS* | 0204 | KING | *IS* | 0205 | TWIN | *IS* |
| 0206 | KING | *IS* | 0207 | TWIN | *IS* | 0208 | KING | *IS* | 0209 | KING | *IS* |
| 0210 | KING | *IS* | 0211 | TWIN | *IS* | 0212 | KING | *IS* | 0213 | KING | *IS* |
| 0214 | KING | *IS* | 0221 | KING | *IS* | 0222 | TWIN | *IS* | 0223 | KING | *IS* |

TABLE II

| \multicolumn{12}{c}{ROOM STATUS SPECIFICATION: (DATE)} |

| ROOM | TYPE | STAT | ROOM | TYPE | STAT | ROOM | TYPE | STAT | ROOM | TYPE | STAT |
|------|------|------|------|------|------|------|------|------|------|------|------|
| 0101 | DBLE | *IS* | 0102 | KING | O100 | 0103 | KING | O100 | 0104 | KING | D100 |
| 0105 | TWIN | *IS* | 0106 | KING | *IS* | 0107 | KING | D100 | 0108 | TWIN | *IS* |
| 0109 | KING | O100 | 0110 | KING | *IS* | 0111 | TWIN | *IS* | 0112 | KING | O100 |
| 0113 | TWIN | *IS* | 0114 | KING | O100 | 0115 | LKNG | *IS* | 0117 | TWIN | *IS* |
| 0118 | KING | *IS* | 0121 | SDBL | *IS* | 0123 | KING | D100 | 0124 | KING | *IS* |
| 0125 | TWIN | *IS* | 0125 | KING | O100 | 0128 | TWIN | *IS* | 0129 | KING | *IS* |
| 0130 | TWIN | *IS* | 0131 | KING | D100 | 0132 | KING | O100 | 0133 | KING | *IS* |
| 0134 | TWIN | *IS* | 0135 | KING | D100 | 0200 | GSTE | O100 | 0201 | DBLE | *IS* |
| 0202 | KING | *IS* | 0203 | KING | O100 | 0204 | KING | D100 | 0205 | TWIN | *IS* |
| 0205 | KING | *IS* | 0207 | TWIN | *IS* | 0208 | KING | *IS* | 0209 | KING | D100 |
| 0210 | KING | D100 | 0211 | TWIN | *IS* | 0212 | KING | O100 | 0213 | KING | *IS* |
| 0214 | KING | O100 | 0221 | KING | *IS* | 0222 | TWIN | *IS* | 0223 | KING | O100 |

TABLE III

| \multicolumn{12}{c}{ROOM STATUS SPECIFICATION: (DATE)} |

| ROOM | TYPE | STAT | ROOM | TYPE | STAT | ROOM | TYPE | STAT | ROOM | TYPE | STAT |
|------|------|------|------|------|------|------|------|------|------|------|------|
| 0102 | KING | O101 | 0103 | KING | O101 | 0104 | KING | D101 | 0107 | KING | D101 |
| 0109 | KING | O101 | 0112 | KING | O101 | 0114 | KING | O101 | 0123 | KING | D101 |
| 0126 | KING | O101 | 0131 | KING | D101 | 0132 | KING | O101 | 0135 | KING | D101 |
| 0200 | GSTE | O102 | 0203 | KING | O102 | 0204 | KING | D102 | 0209 | KING | D102 |
| 0210 | KING | D102 | 0212 | KING | O102 | 0214 | KING | O102 | 0223 | KING | O102 |
| 0227 | KING | D102 | 0229 | KING | O102 | 0231 | KING | O102 | 0233 | KING | O102 |
| 0301 | DBLE | D101 | 0302 | KING | D101 | 0304 | KING | O101 | 0306 | KING | D102 |
| 0308 | KING | D106 | 0309 | KING | D106 | 0312 | KING | D106 | 0313 | KING | D106 |
| 0316 | DBLE | O106 | 0317 | KING | O104 | 0318 | KING | O104 | 0319 | DKNG | O104 |
| 0321 | KING | O104 | 0322 | TWIN | O104 | 0323 | KING | D104 | 0324 | KING | D104 |
| 0326 | KING | D104 | 0327 | KING | D104 | 0329 | KING | D104 | 0330 | TWIN | D104 |
| 0331 | KING | D104 | 0332 | KING | O104 | 0333 | KING | D104 | 0334 | TWIN | D104 |

TABLE IV

ROOM CHANGE WORK SHEET
ROOM ATTENDANT NUMBER: 01 NAME: (JONES)
(DATE)

| ROOM | *STATUS* | OCC | DESCRIPTION | *** COMMENTS *** |
|------|----------|-----|-------------|------------------|
| 0102 | OCCUPIED | 1 | STANDARD KING | — |
| 0103 | OCCUPIED | 1 | STANDARD KING | — |
| 0104 | DUE OUT | 1 | STANDARD KING | — |
| 0107 | DUE OUT | 1 | STANDARD KING | — |
| 0109 | OCCUPIED | 1 | STANDARD KING | — |
| 0112 | OCCUPIED | 1 | STANDARD KING | — |
| 0114 | OCCUPIED | 1 | STANDARD KING | — |
| 0123 | DUE DUT | 1 | STANDARD KING | — |
| 0126 | OCCUPIED | 1 | STANDARD KING | — |
| 0131 | DUE OUT | 1 | STANDARD KING | — |
| 0132 | OCCUPIED | 1 | STANDARD KING | — |
| 0136 | DUE OUT | 1 | STANDARD KING | — |
| 0301 | DUE OUT | 1 | STANDARD DOUBLE | — |

TABLE V

ROOMS not CHANGED: (DATE) (TIME)

| FLOOR: 01 CLOSET: | 0102-KING | 0103-KING | 0104-KING | 0107-KING | 0109-KING | 0112-KING | 0114-KING | 0123-KING |
| | 0126-KING | 0131-KING | 0132-KING | 0135-KING | | | | |
| FLOOR: 02 CLOSET: | 0200-GSTE | 0203-KING | 0204-KING | 0209-KING | 0210-KING | 0212-KING | 0214-KING | 0223-KING |
| | 0227-KING | 0229-KING | 0231-KING | 0233-KING | | | | |
| FLOOR: 03 CLOSET: | 0301-DBLE | 0302-KING | 0304-KING | 0306-KING | 0308-KING | 0309-KING | 0312-KING | 0313-KING |
| | 0316-DBLE | 0317-KING | 0318-KING | 0319-DKNG | 0321-KING | 0322-TWIN | 0323-KING | 0324-KING |
| | 0326-KING | 0327-KING | 0329-KING | 0330-TWIN | 0331-KING | 0332-KING | 0333-KING | 0334-TWIN |
| | 0335-KING | | | | | | | |
| FLOOR: 04 CLOSET: | 0401-DBLE | 0407-TWIN | 0419-DKNG | | | | | |
| FLOOR: 05 CLOSET: | 0501-DBLE | 0516-DBLE | 0519-DKNG | 0523-KING | 0528-TWIN | | | |
| FLOOR: 06 CLOSET: | 0602-KING | 0603-KING | 0610-KING | 0611-TNIN | 0617-KING | 0626-KING | 0627-KING | |
| FLOOR: 07 CLOSET: | 0703-KING | 0704-KING | 0709-KING | 0710-KING | 0712-KING | 0714-KING | 0716-DBLE | 0718-KING |
| | 0721-KING | 0723-KING | 0726-KING | 0727-KING | 0729-KING | 0731-KING | 0733-KING | 0735-KING |
| FLOOR: 08 CLOSET: | 0803-KING | 0804-KING | 0810-KING | 0811-TNIN | 0817-KING | 0818-KING | 0821-KING | 0823-KING |
| | 0824-KING | 0829-KING | 0832-KING | 0833-KING | | | | |
| FLOOR: 09 CLOSET: | 0901-DBLE | 0918-KING | 0923-KING | 0926-KING | 0927-KING | 0928-TWIN | 0929-KING | 0935-KING |
| FLOOR: 10 CLOSET: | 1002-KING | 1003-KING | 1009-KING | 1010-KING | 1011-TWIN | 1013-KING | 1016-DBLE | 1023-KING |
| | 1026-KING | 1028-TWIN | 1029-KING | | | | | |
| FLOOR: 11 CLOSET: | 1112-KING | 1123-KING | 1129-KING | 1132-KING | | | | |
| FLOOR: 12 CLOSET: | 1214-GSTE | 1219-DKNG | 1229-DKNG | | | | | |

TABLE VI

ROOMS CHANGED not OCCUPIED: (DATE) (TIME)

| FLOOR: 01 CLOSET: | 0 NONE |
| FLOOR: 02 CLOSET: | 0 NONE |
| FLOOR: 03 CLOSET: | 0 NONE |
| FLOOR: 04 CLOSET: | 0 NONE |
| FLOOR: 05 CLOSET: | 0 NONE |
| FLOOR: 06 CLOSET: | 0 NONE |
| FLOOR: 07 CLOSET: | 0 NONE |
| FLOOR: 08 CLOSET: | 0 NONE |
| FLOOR: 09 CLOSET: | 0 NONE |
| FLOOR: 10 CLOSET: | 0 1004-KING 1017-KING |
| FLOOR: 11 CLOSET: | 0 NONE |
| FLOOR: 12 CLOSET: | 0 NONE |

TABLE VII

ROOMS SUMMARY REPORT
(DATE) (TIME)

| ** ITEM DESCRIPTION ** | ROOMS | MISSING | DISCARD | INVALID | EXTRA | TURNDOWN | TOTAL | LAUNDRY |
|---|---|---|---|---|---|---|---|---|
| Double Sheets | 38 | 0 | 0 | 2 | 0 | 0 | 40 | 40 |
| King Sheet | 116 | 0 | 0 | 0 | 0 | 0 | 116 | 116 |
| Dble Crinkle Sheets | 0 | 0 | 0 | 0 | 0 | 0 | 0 | 0 |
| King Crinkle Sheets | 0 | 0 | 0 | 0 | 0 | 0 | 0 | 0 |
| Pillow Cases | 181 | 0 | 0 | 0 | 0 | 0 | 181 | 181 |
| Bath Robes | 3 | 0 | 0 | 0 | 0 | 0 | 3 | 3 |
| Bath Rugs | 7 | 0 | 0 | 0 | 0 | 0 | 7 | 7 |
| Grey Bath Rugs | 0 | 0 | 0 | 0 | 0 | 0 | 0 | 0 |
| Bath Mats | 65 | 0 | 0 | 0 | 0 | 0 | 65 | 65 |
| Blue Bath Msts | 0 | 0 | 0 | 0 | 0 | 0 | 0 | 0 |
| Bath Sheets | 4 | 0 | 0 | 0 | 0 | 0 | 4 | 4 |
| Bath Towels | 119 | 0 | 0 | 0 | 0 | 0 | 119 | 119 |
| Grey Bath Towels | 0 | 0 | 0 | 0 | 0 | 0 | 0 | 0 |
| Hand Towels | 133 | 0 | 0 | 0 | 0 | 0 | 133 | 133 |
| Grey Hand Towels | 0 | 0 | 0 | 0 | 0 | 0 | 0 | 0 |
| Waeh Cloths | 76 | 0 | 0 | 0 | 0 | 0 | 76 | 76 |
| Blue Wash Cloths | 0 | 0 | 0 | 0 | 0 | 0 | 0 | 0 |
| Shower Curtains | 0 | 0 | 0 | 0 | 0 | 0 | 0 | 0 |
| Double Bed Pads | 0 | 0 | 0 | 0 | 0 | 0 | 0 | 0 |
| King Bed Pads | 0 | 0 | 0 | 0 | 0 | 0 | 0 | 0 |
| Double Blankets | 0 | 0 | 0 | 0 | 0 | 0 | 0 | 0 |
| King Blankets | 0 | 0 | 0 | 0 | 0 | 0 | 0 | 0 |
| TOTAL | 742 | 0 | 0 | 2 | 0 | 0 | 744 | 744 |

TABLE VIII

ROOMS OCCUPANCY REPORT

| FLOOR | TOTAL ROOMS | ROOMS ON CHANGE | ROOMS CHANGED | ROOMS NOT CHNGD | ROOMS CHANGED NOT OCCUP | PERCENT CHANGED | PERCENT OCCUP |
|---|---|---|---|---|---|---|---|
| 01 | 30 | 12 | 6 | 6 | 0 | .50 | .40 |
| 02 | 30 | 12 | 2 | 10 | 0 | .17 | .40 |
| 03 | 35 | 25 | 8 | 17 | 0 | .32 | .71 |
| 04 | 35 | 3 | 0 | 3 | 0 | .00 | .09 |
| 05 | 35 | 8 | 3 | 5 | 0 | .38 | .23 |
| 06 | 34 | 10 | 3 | 7 | 0 | .30 | .29 |
| 07 | 35 | 20 | 4 | 16 | 0 | .20 | .57 |
| 08 | 35 | 24 | 12 | 12 | 0 | .50 | .69 |
| 09 | 34 | 17 | 9 | 8 | 0 | .53 | .50 |
| 10 | 34 | 23 | 11 | 12 | 2 | .48 | .68 |
| 11 | 34 | 10 | 8 | 4 | 4 | .60 | .29 |
| 12 | 28 | 4 | 1 | 3 | 9 | .25 | .14 |
| TOTAL | 399 | 168 | 65 | 103 | 2 | .39 | .42 |

TABLE IX

(DATE) (TIME) ROOMS CHECK REPORT

| | 0123 KING | | | 0203 KING | | | 0801 DBLE | | | D815 TWIN | | |
|---|---|---|---|---|---|---|---|---|---|---|---|---|
| ITEM DESCRIPTION | ROOM SOIL | TYPE MSSG | STAT TOTL | ROOM SOIL | TYPE MSSG | STAT TOTL | ROOM SOIL | TYPE MSSG | STAT TOTL | ROOM SOIL | TYPE MSSG | STAT TOTL |
| Dbl Shts | 0 | 0 | 0 | 0 | 0 | 0 | 4 | 0 | 4 | 2 | 0 | 2 |
| Kng Shts | 2 | 0 | 2 | 2 | 0 | 2 | 0 | 0 | 0 | 0 | 0 | 0 |
| P. Cases | 4 | 0 | 4* | 5 | 0 | 5* | 5 | 0 | 5* | 2 | 0 | 2 |
| B Mat | 1 | 0 | 1 | 1 | 0 | 1 | 1 | 0 | 1 | 1 | 0 | 1 |
| B. Towels | 3 | 0 | 3 | 2 | 0 | 2 | 3 | 0 | 3 | 2 | 0 | 2 |

TABLE IX-continued (DATE) (TIME) ROOMS CHECK REPORT

| | 0123 KING | | | 0203 KING | | | 0801 DBLE | | | D815 TWIN | | |
|---|---|---|---|---|---|---|---|---|---|---|---|---|
| ITEM DESCRIPTION | ROOM SOIL | TYPE MSSG | STAT TOTL | ROOM SOIL | TYPE MSSG | STAT TOTL | ROOM SOIL | TYPE MSSG | STAT TOTL | ROOM SOIL | TYPE MSSG | STAT TOTL |
| H. Towels | 3 | 0 | 3 | 3 | 0 | 3 | 3 | 0 | 3 | 4 | 0 | 4* |
| W. Cloths | 2 | 0 | 2 | 2 | 0 | 2 | 1 | 0 | 1 | 3 | 0 | 3* |
| *TOTAL: | 15 | 0 | 15 | 15 | 0 | 15 | 17 | 0 | 17 | 14 | 0 | 14 |

What is claimed is:

1. A system for keeping track of the location and quantity of linen items used by and laundered for hotels, hospitals and other facilities having multiple rooms in which linen items of different types are used and require laundering in a laundering process, said system comprising:

multiple containers, one container for each of said rooms, each container for receiving soiled linen items placed therein from a respective room when the room is made up by a room attendant;

multiple linen control lists, one control list for each of said rooms, each control list for receiving indicia recorded thereon by a room attendant when making up the room, said indicia representing the quantity of each type of soiled linen item placed in the room container by the room attendant and the quantity of each type of linen item missing from the room being made up, wherein each linen control list when placed in or secured to a respective container indicates the quantity and type of soiled linen items disposed in the container and linen items missing from the room being made up;

plural intermediate linen storage locations, each for storing clean linen items to be used by room attendants in making up a respective group of said rooms;

a central storage linen location for receiving laundered linen items and storing linen items for distribution to said intermediate linen storage locations;

a computer including data storage means for storing information representing the quantity of each type of said linen items in each of plural locations including said intermediate linen storage locations, said central linen storage location, in the laundering process, and said rooms; and data entry means for updating said information in said data storage means with the quantity of soiled and missing linen items from each room as recorded on said linen control lists, and upon transport of linen items fro one of said locations to another.

2. The system according to claim 1 further comprising:

room status means in said computer for storing and displaying a rooms status list of all of said rooms indicating the type and occupancy status of each room;

wherein said data entry means includes means for selectively changing the occupancy status on said rooms status list at the beginning of each day to reflect whether or not each room has been occupied the previous night; and wherein said rooms status means includes means for storing and displaying an updated rooms status list containing only those rooms that were occupied the previous night and thereby require change of linens.

3. The system according to claim 2 wherein said data entry means includes means for amending said stored updated rooms status list by adding room attendant codes identifying room attendants assigned to change linens for each room requiring a linen change, and wherein said system further includes:

means responsive to the information in the amended updated room status list for providing a plurality of room change lists, one list for each room attendant, each room change list identifying a respective room attendant and the rooms assigned to that room attendant for linen change.

4. The system according to claim 3 wherein said computer further comprises:

means for storing and selectively displaying a rooms not changed list indicating which of said rooms requiring linen change for the day have not had their linens changed; and means responsive to entry into said computer of each room's soiled and missing linen item quantities for deleting that room from said rooms not changed list.

5. The system according to claim 4 wherein said computer further comprises replenishment listing means responsive to soiled and missing linen item quantities entered into said computer for storing and selectively displaying a replenishment list indicating the quantity and type of linen items required to be replenished at each of said intermediate storage locations.

6. The system according to claim 5 wherein said computer further comprises shipping list means responsive to soiled linen item quantities entered into said computer for storing and selectively displaying a shipping list indicating the quantity and type of all soiled linen items collected in said containers from every room.

7. The system according to claim 2 wherein said computer further comprises:

means for storing and selectively displaying a rooms not changed list indicating which of said rooms requiring linen change for the day have not had their linens changed; and means responsive to entry into said computer of each room's soiled and missing linen item quantities for deleting that room from said rooms not changed list.

8. The system according to claim 2 wherein said computer further comprises replenishment listing means responsive to soiled and missing linen item quantities entered into said computer for storing and selectively displaying a replenishment list indicating the quantity and type of linen items required to be replenished at each of said intermediate storage locations.

9. The system according to claim 2 wherein said computer further comprises shipping list means responsive to soiled linen item quantities entered into said computer for storing and selectively displaying a shipping list indicating the quantity and type of all soiled linen items collected in said containers from every room.

10. A computerized method for keeping track of the quantity and location of linen items of different types in hotels and institutions having multiple rooms wherein soiled linen items are periodically taken to a laundry and replaced with clean linen items taken from plural intermediate linen storage locations serving respective groups of said rooms, said method comprising the steps of:

(a) as part of the room make-up procedure, disposing soiled linen items found in said rooms in respective room containers identified by room number and recording an indication of each soiled linen item placed therein;

(b) when noting during the room make-up procedure that linen items are missing, recording an indication of each missing linen item;

(c) as part of the room make-up procedure, replacing soiled linen items with clean linen items obtained from the intermediate linen storage location serving that room;

(d) entering into a computer, by room, the total quantity of soiled linen items of each type indicated in step (a);

(e) entering into said computer, by room, the total number of linen items missing from each room as indicated in step (b);

(f) generating with said computer a list of the total of soiled linen items of each type to be laundered;

(g) for each intermediate storage location, computing the total of both soiled and missing linen items of each type entered into the computer in steps (d) and (e) for each group of rooms served by each respective storage location; and (h) using the total computed in step (g) to provide a distribution list of the total of linen items of each type that must be replaced at each intermediate storage location.

11. The method according to claim 10 wherein step (b) includes, for each item of linen noted as missing from a room, attaching to the room container a respective missing item tag identifying the missing item of linen.

12. The method according to claim 10 wherein step (a) includes identifying the room number for each container by affixing an ID tag bearing said room number to said each container.

13. The method according to claim 10 further comprising the steps of:

(i) entering the occupancy status of each room into the computer at the start of each day;

(j) entering and storing room assignments for room attendants in said computer at the start of each day; and (k) from the occupancy status entered in step (i) and the room assignments stored in step (j), providing for each room attendant a daily list of rooms to be made up that day by that room attendant.

14. The method according to claim 13 further comprising the steps of:

(l) as each room is made-up, entering a made up status for said each room into the computer; and (m) generating a list of all rooms that require make up that day and updating that list by deleting rooms therefrom as rooms make-up information is entered in step (l).

15. The method according to claim 10 further comprising the steps of:

(i) entering the occupancy status of each room into the computer for the start of each day;

(j) from the occupancy status entered in step (i), providing a list of all rooms to be made up that day;

(k) as each room is made up, entering that information into the computer; and (l) in response to the information entered into the computer in step (k), updating said list of all rooms to show which rooms have and have not been made up.

16. The method according to claim 14 further comprising the step of providing a daily list of all rooms showing linen items missing from said rooms based on the total numbers entered into the computer in step (e).

17. The method according to claim 10 further comprising the step of providing an inventory report showing the number and type of each of said linen items that are currently located in rooms, in intermediate storage locations, in a central storage location and in the laundry.

18. A method for keeping track of the location and quantity of linen items used by and laundered for hotels and facilities having multiple rooms in which linen items are used and require laundering in a laundering process, said method comprising the steps of:

(a) storing in a computer a rooms status list of all of said rooms, said list indicating for each room the room type and occupancy status;

(b) at the beginning of each day, updating in the computer said rooms status list by selecting for cleaning that day rooms having an on change status indicating rooms that were occupied the previous night;

(c) entering for each of said rooms having an on change status in the updated rooms status list an identification code for a room attendant assigned to clean said each room having an on change status;

(d) from the information entered in step (c):

(d.1) generating in said computer a plurality of room attendant assignment lists, one assignment list for each room attendant, indicating all of the rooms assigned for cleaning by that attendant; and (d.2) generating a list of all rooms having an on change status;

(e) as part of cleaning of each room by a room attendant, placing all soiled linen items from that room in a container for that room, there being one such container for each room;

(f) recording on a control list for each room as the room is being cleaned the quantity of each type of soiled linen item placed in the room container and the quantity of each type of linen item missing from the room;

(g) placing the control list for each room in or on the room in or on the room container;

(h) collecting all of the room containers and removing the control lists therefrom;

(i) entering into said computer the quantities of soiled and missing linen items recorded on said control lists on a room by room basis;

(j) in response to entry of soiled linen item quantities for each room in step (i), deleting that room from said list of all rooms having an on change status.

19. The method according to claim 18 further comprising the steps of:

(k) storing in said computer inventory information representing the quantity of each type of linen item in each of plural locations including intermediate linen storage locations serving plural rooms, a central linens storage location, rooms, and the laundering process; and (l) in response to entry of soiled and missing linen item quantities for each room in step (i), automatically updating said inventory information accordingly.

20. The method according to claim 19 further comprising the step of:
(m) in response to entry of all of the soiled and missing linen item quantities for each room in step (i), generating linens replenishment lists for each intermediate linens storage location, the replenishment lists indicating the quantity of each type of linen item that must be replenished in that intermediate linens storage location in order to supply the rooms served from that intermediate linens storage location.

21. The method according to claim 20 further comprising the steps of:
(n) entering into said computer the quantity and new location of each type of linen item moved from one location to another; and
(o) automatically updating the inventory information with quantities and locations entered into the computer in step (n).

* * * * *